T. H. WOOD, Dec'd.

Assignor to J. B. BREWSTER & COMPANY.

LIGHT CARRIAGE.

No. 10,998. Reissued Apr. 30, 1889.

Witnesses.

Fred Kimber

S. V. Edmonds

Inventor

Thomas H. Wood

J. B. Brewster & Co

Assignee by Gifford & Brown

Attys

N. PETERS, Photo-Lithographer, Washington, D. C.

UNITED STATES PATENT OFFICE.

J. B. BREWSTER & COMPANY, OF NEW YORK, N. Y., ASSIGNEES OF THOMAS H. WOOD, DECEASED.

LIGHT CARRIAGE.

SPECIFICATION forming part of Reissued Letters Patent No. 10,998, dated April 30, 1889.

Original No. 139,348, dated May 27, 1873. Reissue No. 6,018, dated August 18, 1874. Application for present reissue filed March 15, 1889. Serial No. 303,500.

*To all whom it may concern:*

Be it known that THOMAS H. WOOD, late of the city, county, and State of New York, has invented a new and useful Improvement in Light Carriages, of which the following is a specification.

Figure 1:
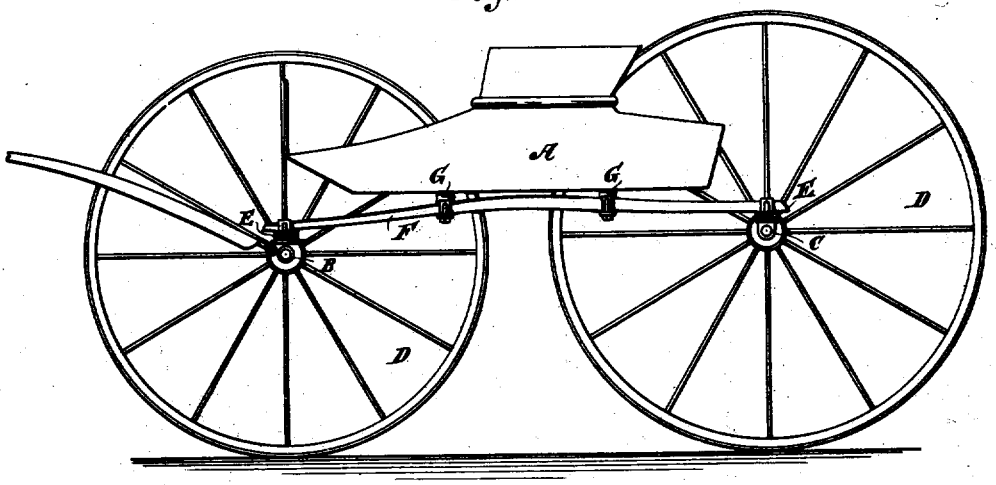
Figure 2:
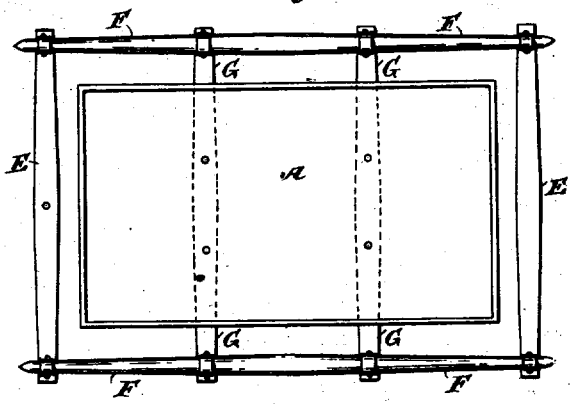

Figure 1 is the side elevation of a vehicle with the near wheels removed. Fig. 2 is a plan view of the supporting-frame with the box or buggy-body resting thereon.

Similar letters of reference indicate corresponding parts.

This invention relates to an improved arrangement of transverse springs on light wagons, and has for its object to combine in a wagon supported on single transverse springs and side bars the advantage of elasticity of double elliptic transverse springs and of the deep setting of the body obtained at present by using the single springs. Light carriages supported on double elliptic springs raise the bodies too high for convenience, and are, moreover, more expensive than those having single springs. On the other side, such carriages as are at present supported on single transverse springs whose ends connect with side bars rigidly secured to the wagon-bodies are not sufficiently elastic and yielding to suit the rapid motion to which they are frequently subjected.

The invention consists in the improvement of light vehicles, as hereinafter described, and pointed out in the claim.

In the accompanying drawings, the letter A represents the body of a light carriage of suitable style. B and C are the axles of the carriage, and D D the wheels. Upon the axles are fastened the middle portions of transverse springs E E, whose ends are secured to side bars, F F. These side bars are made of hickory wood or other material, and aid, with whatever elasticity they may possess, in making the support of the body A yielding. To the under side of the carriage-body A are secured transverse springs G G, whose ends connect, by suitable couplings, with the side bars, F F, beneath the side bars, as is clearly shown in the drawings. The springs G G and E E can be made of metal or wood or other material, and are semi-elliptic or flat springs in contradistinction to the full elliptic spring heretofore used as direct supports for carriage-bodies on their axles.

It will be observed that each middle spring, G, extends from the body to a coupling beneath each side bar. This construction is distinguishable from any wagon in which each middle spring extends from the body to a coupling above each side bar, because in the latter wagon, in order to get the requisite deep setting of the body, each end of each middle spring is extended underneath each side bar and thence upward outside the side bar and with an inward turn to the coupling above the side bar, forming in all four semicircular springs outside of the side bars, which, by passing the vertical and having the chords of their curves substantially vertical, tend to produce a longitudinal or lateral swing.

The invention having been thus described, what is claimed as new, and desired to be secured by Letters Patent, is—

A frame consisting of the longitudinal side bars, F F, downwardly-bowed end springs, E E, and upwardly-bowed middle springs, G G, constructed, arranged, and applied as and for the purpose described, each middle spring being connected to the under side of the body and to the under side of each side bar.

J. B. BREWSTER & CO.,
By JAMES B. BREWSTER, [L. S.]
*Prest.*

Witnesses:
WM. P. FEST,
FRED KEMPER.